(12) United States Patent
Chujoh et al.

(10) Patent No.: US 7,085,427 B2
(45) Date of Patent: *Aug. 1, 2006

(54) IMAGE FILTER PROCESSING APPARATUS AND METHOD

(75) Inventors: Takeshi Chujoh, Tokyo (JP); Shinichiro Koto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 10/912,180

(22) Filed: Aug. 6, 2004

(65) Prior Publication Data

US 2005/0008252 A1 Jan. 13, 2005

Related U.S. Application Data

(62) Division of application No. 09/944,082, filed on Sep. 4, 2001, now Pat. No. 6,801,669.

(30) Foreign Application Priority Data

Sep. 14, 2000 (JP) .............................. 2000-280832

(51) Int. Cl.
*G06K 9/40* (2006.01)

(52) U.S. Cl. ........................ 382/263; 382/264; 382/270
(58) Field of Classification Search ................ 382/261, 382/263, 264, 265, 266, 275, 254, 260; 358/443, 358/448, 463
See application file for complete search history.

(56) References Cited

U.S. PATENT DOCUMENTS

| 5,202,764 A | 4/1993 | Ida et al. |
| 5,581,371 A | 12/1996 | Spaulding et al. |
| 6,347,161 B1 | 2/2002 | Mancuso |
| 6,681,054 B1 | 1/2004 | Gindele |

*Primary Examiner*—Yon J. Couso
(74) *Attorney, Agent, or Firm*—Oblon, Spivak, McClelland, Maier & Neustadt, P.C.

(57) ABSTRACT

A memory stores an output value as a filter processing result. A first calculator calculates a difference between an input value of an image signal and the output value stored in the memory. The output value is the filter processing result of a previous input value. A lookup table stores a plurality of difference values and change values, and outputs the change value corresponding to the difference calculated by the first calculator. The change value is a product of the difference and a value which is above "0" and below "1" if an absolute value of the difference is below a threshold, and the change value is a product of the difference and a value which is above "−1" and below "0" if the absolute value is above the threshold. A second calculator outputs a difference between the input value and the change value.

18 Claims, 9 Drawing Sheets

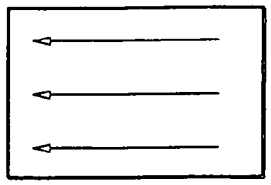 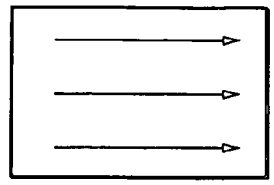 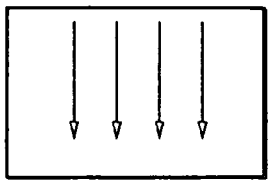 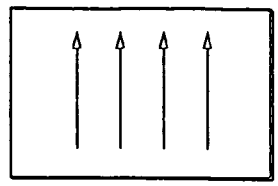
FIG.5A   FIG.5B   FIG.5C   FIG.5D
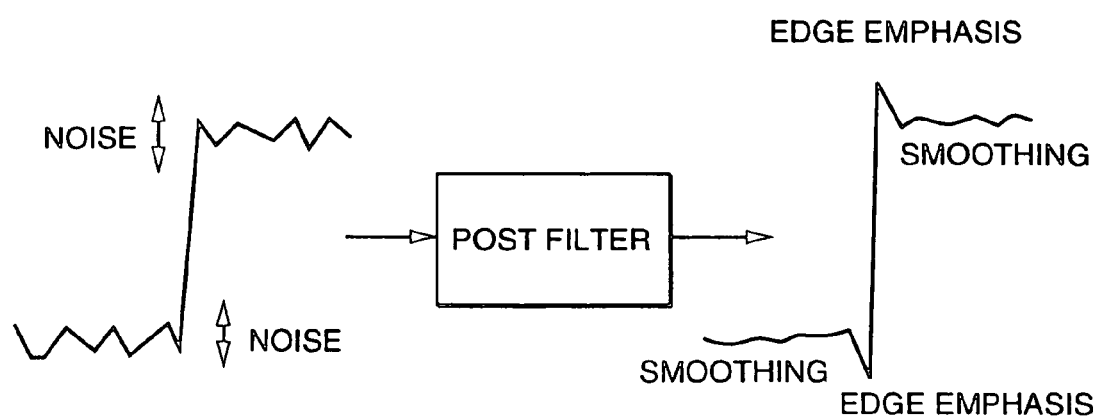
FIG.6

IMAGE FILTER PROCESSING APPARATUS AND METHOD

CROSS-REFERENCE TO RELATED APPLICATIONS

This application is based upon and claims the benefit of priority from the prior Japanese Patent Application PH2000-280832, filed on Sep. 14, 2000; the entire contents of which are incorporated herein by reference.

FIELD OF THE INVENTION

The present invention relates to an image filter processing apparatus and method for effectively executing a post filter processing for an image.

BACKGROUND OF THE INVENTION

Post filter processing is a filter processing for an image after some processing is executed for the image. For example, after a dynamic image is decoded, post filter processing reduces noise caused by compression in case of coding the dynamic image. Especially, in image coding methods using DCT (Discrete Cosine Transformation) such as MPEG method, block noise is generated because of coding by unit of block, and mosquito noise as quasi-high frequency element is generated because of quantization. Furthermore, a high frequency element is lost by quantization in case of coding. As a result, an edge part in an image becomes dull and the image blurs.

In order to improve these defects, in general, the post filter processing is adaptively executed based on characteristics of the image. However, in typical post filter processing, the filter processing is executed pixel-by-pixel on the image, and a large calculation quantity is necessary. For example, in case of CIF format used for "ITU-TH.261, H.263, ISO/IEC MPEG-4", as for luminance signal on the image, "352" pixels along a horizontal line and "288" pixels along a vertical line are included, and the filter processing must be executed for a total of "101,376" pixels. If such processing of large calculation quantity is performed by software, the real time processing becomes difficult. If it is performed by hardware, the cost becomes expensive.

On the other hand, in case of size conversion of coded image, a size conversion method using a filter after decoding and a size conversion method using conversion coefficients such as DCT coefficient, are well known. In both methods, if the size of an image including a coded noise is converted, the coded noise is also expanded by the size conversion processing. Accordingly, even if the post filter processing is executed after size conversion, the coded noise remains in the image. Furthermore, if the size conversion processing is executed after the post filter processing, in case of magnification, the image becomes blurred. In case of reduction, an aliasing is generated by sharpening processing.

As mentioned-above, in the post filter processing of the prior art, the filter processing is executed pixel-by-pixel on the image. Accordingly, a large calculation quantity is necessary. Furthermore, in the size conversion processing of the image, in case of size conversion of coded image, the post filter processing cannot be effectively executed for the encoded image.

BRIEF SUMMARY OF THE INVENTION

It is an object of the present invention to provide an image filter processing apparatus and method for simultaneously executing a noise reduction filter processing and a sharpening filter processing for the image by small calculation quantity.

According to an aspect of the present invention, there is provided an image filter processing apparatus, comprising: a memory configured to temporarily store an output value as a filter processing result; a first calculator configured to calculate a difference between an input value of image signal and the output value stored in said memory, the output value being the filter processing result of a previous input value by one unit time; a lookup table configured to respectively store a plurality of difference values and a change value, and to output the change value corresponding to the difference calculated by said first calculator, the change value being a product of the difference and a value which is above "0" and below "1" if an absolute value of the difference is below a threshold, and the change value being a product of the difference and a value which is above "−1" and below "0" if the absolute value is above the threshold; and a second calculator configured to output a difference between the input value and the change value, an output value as the difference being newly stored in said memory.

Further in accordance with another aspect of the present invention, there is also provided an image filter processing method, comprising: temporarily storing an output value as a filter processing result in a memory; calculating a difference between an input value of image signal and the output value stored in the memory, the output value being the filter processing result of a previous input value by one unit time; outputting a change value corresponding to the difference, the change value being a product of the difference and a value which is above "0" and below "1" if an absolute value of the difference is below a threshold, and the change value being a product of the difference and a value which is above "−1" and below "0" if the absolute value is above the threshold; and outputting a difference between the input value and the change value, the output value as the difference being newly stored in the memory.

Further in accordance with another aspect of the present invention, there is also provided an image processing apparatus, a noise reduction filter processing unit configured to execute a noise reduction filter processing for input image signal; a size conversion processing unit configured to execute a size conversion processing for image signal output from said noise reduction filter processing unit; and a sharpening filter processing unit configured to execute a sharpening filter processing for image signal output from said size conversion processing unit; wherein said noise reduction filter processing unit including: a memory configured to temporarily store an output value as the noise reduction filter processing result; a first calculator configured to calculate a difference between an input value of the image signal and the output value stored in said memory, the output value being the noise reduction filter processing result of a previous input value by one unit time; a lookup table configured to respectively store a plurality of difference values and a change value, and to output the change value corresponding to the difference calculated by said first calculator, the change value being a product of the difference and a value which is above "0" and below "1" if an absolute value of the difference is below a threshold; and a second calculator configured to output a difference between the input value and the change value, an output value as the difference being newly stored in said memory; wherein said sharpening filter processing unit including: a memory configured to temporarily store an output value as a sharpening filter processing result; a first calculator configured to calculate a difference between an input value of image signal and the output value stored in said memory, the output value being the sharpening filter processing result of a previous input value by one unit time; a lookup table configured to respectively store a plurality of difference values and a change value, and to output the change value corresponding to the difference calculated by said first calculator, the change value being a product of the difference and a value which is above "−1" and below "0" if an absolute value of the difference is above a threshold; and a second calculator configured to output a difference between the input value and the change value, an output value as the difference being newly stored in said memory.

Further in accordance with another aspect of the present invention, there is also provided an image processing method, comprising: executing a noise reduction filter processing for input image signal; executing a size conversion processing for image signal of the noise reduction processing result; and executing a sharpening filter processing for image signal of the size conversion processing result; at the executing step of the noise reduction filter processing, comprising: temporarily storing an output value as the noise reduction filter processing result in a memory; calculating a difference between an input value of the image signal and the output value stored in the memory, the output value being the noise reduction filter processing result of a previous input value by one unit time; outputting a change value corresponding to the difference, the change value being a product of the difference and a value which is above "0" and below "1" if an absolute value of the difference is below a threshold; and outputting a difference between the input value and the change value, an output value as the difference being newly stored in the memory; at the executing step of the sharpening filter processing, comprising: temporarily storing an output value as a sharpening filter processing result in a memory; calculating a difference between an input value of image signal and the output value stored in the memory, the output value being the sharpening filter processing result of a previous input value by one unit time; outputting a change value corresponding to the difference, the change value being a product of the difference and a value which is above "−1" and below "0" if an absolute value of the difference is above a threshold; and outputting a difference between the input value and the change value, an output value as the difference being newly stored in the memory.

BRIEF DESCRIPTION OF THE DRAWINGS

FIGS. 5A, 5B, 5C and 5D are examples showing a scan direction to input the image data.

FIG. 6 is a schematic diagram showing an effect of the post filter processing according to the first embodiment of the present invention.

DETAILED DESCRIPTION OF THE INVENTION

Figure 1:
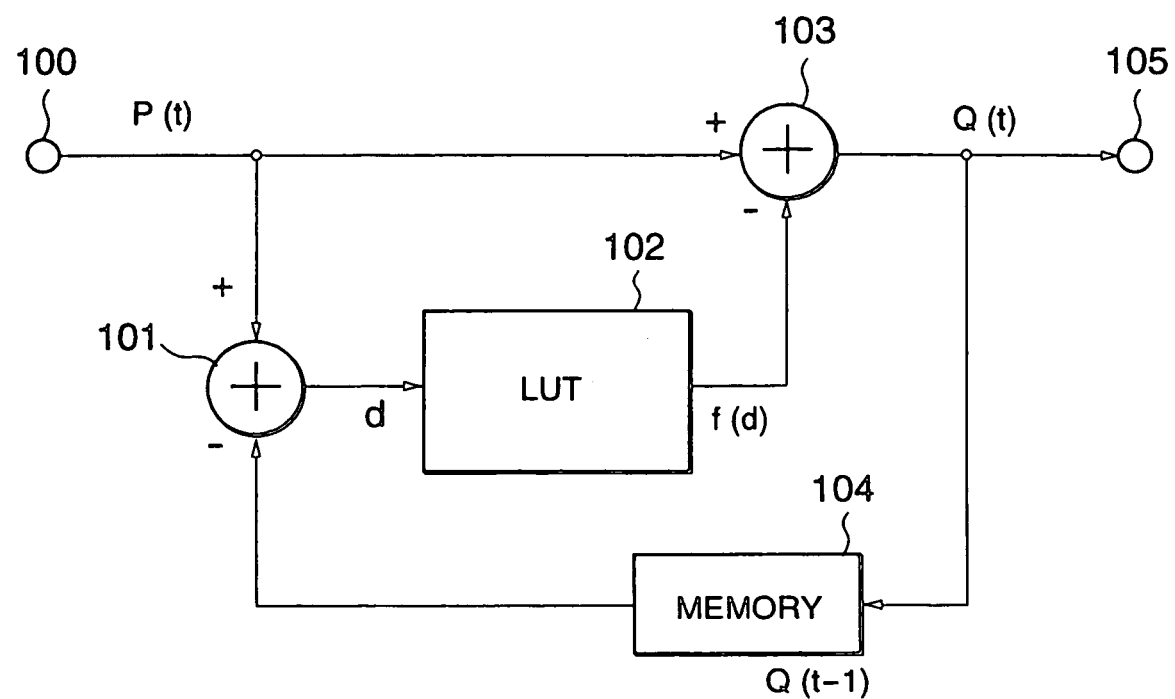
FIG. 1 is a block diagram of the image filter processing apparatus according to a first embodiment of the present invention.

Hereinafter, various embodiments of the present invention will be explained by referring to the drawings. FIG. 1 is a block diagram of the image filter processing apparatus according to the first embodiment of the present invention. The image filter processing apparatus includes: an input terminal 100 to input a pixel value (input value) of an image signal, an output terminal 105 to output a pixel value (output value as post filter processing result) of a previous image signal advanced by one time unit compared with the input image signal, an adder 101 to calculate a difference between the input value and the output value, a lookup table to output a change value corresponding to the difference as an address, an adder 103 to calculate an output value by changing the input value based on the change value, and a memory 104 to temporarily store the output value. In the lookup table 102, each of a plurality of differences calculated by the adder 101 and corresponding change values are previously stored.

Next, operation of the image filter processing apparatus of the first embodiment is explained. Assume that the input value is P[t] and the output value is Q[t]. In this case, "t" represents the position of a pixel. In order to execute the filter processing for the pixel of position "t" the input value P[t] and the output value Q[t−1] of a previous pixel of position "t−1" stored in the memory 104, are input to the adder 101. The adder 101 calculates a difference "d" between the input value P[t] and the output value Q[t−1]. The lookup table 102 receives the difference "d", and a change value "f(d)" is output from the lookup table 102 to the adder 103. The adder 103 subtracts the change value f(d) from the input value P[t] and generates the output value Q[t] as the difference. A series of this operation is represented by the following expressions.

$$Q[t]=P[t]-f(d) \quad (1)$$

$$d=P[t]-Q[t-1] \quad (2)$$

In the lookup table 102, a large number of change values "f(d)" previously calculated by function "f" are stored in correspondence with each difference "d". For example, if the pixel value is eight bit data whose limit is "0~255", a limit of the difference "d" is "−255~+255". In this case, the lookup table 102 prepares 511 units of arrangement. Accordingly, in this image filter processing apparatus, calculation necessary for filter processing of one pixel is two times addition by the adders 101 and 103.

As shown in the following expression (3), the basis of this filter processing is a weighted sum of the input pixel value P[t] as a present pixel and the output value Q[t−1] corresponding to an input pixel value P[t−1] as a previous pixel neighboring the present pixel. In this case, a weighted coefficient "α" changes with the difference "d".

$$Q[t]=(1-\alpha)P[t]+\alpha Q[t-1] \quad (3)$$

The calculation of the weighted coefficient "α" is represented by the difference "d" in the expression (2) as a variable as follows.

$$Q[t]=P[t]-\alpha d \quad (4)$$

Where:

$$0<\alpha<1 \quad (5)$$

Q[t] is a weighted average of the input value P[t] of the present pixel and the output value Q[t−1] of the previous pixel. This calculation represents a smoothing processing.

On the other hand, if:

$$-1<\alpha<0 \quad (6)$$

Figure 2:
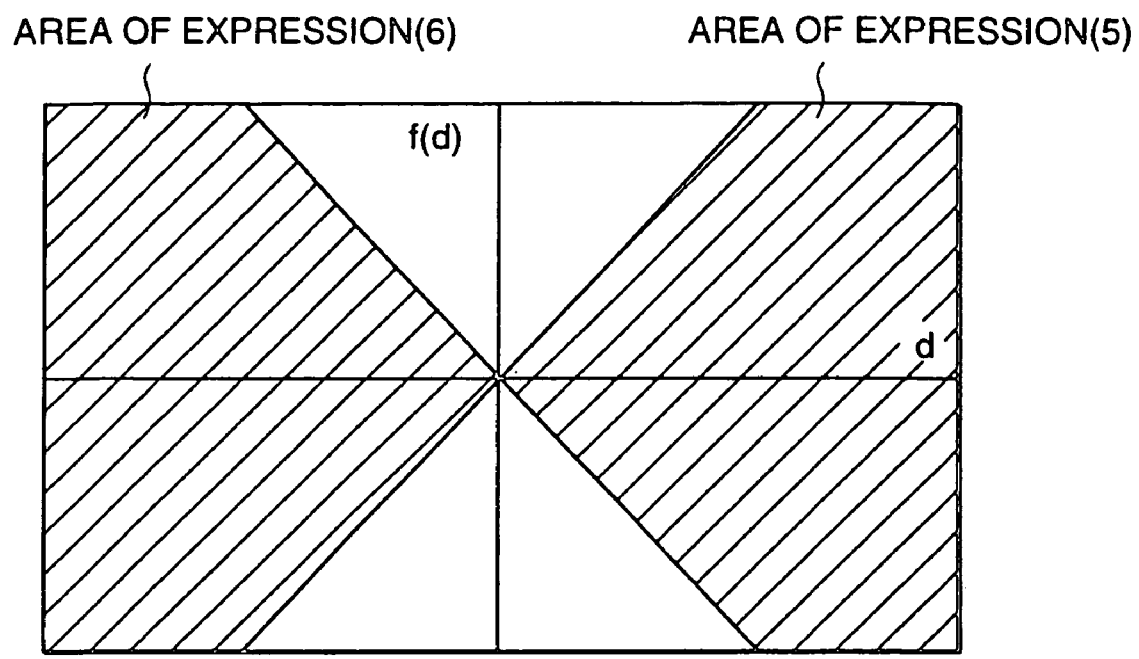
FIG. 2 is a schematic diagram showing a concept of a lookup table.

Q[t] is calculated by adding a change value to P[t], and the change value is determined in proportion to the difference between the input value P[t] and the output value Q[t−1]. This calculation represents a sharpening processing. FIG. 2 shows a graph representing the above-mentioned relation. In this graph, the vertical axis represents "f(d)" and the horizontal axis represents "d". In FIG. 2, an area represented by oblique lines of right ascent corresponds to the expression (5), and an area represented by oblique lines of right drop corresponds to the expression (6).

Figure 3:
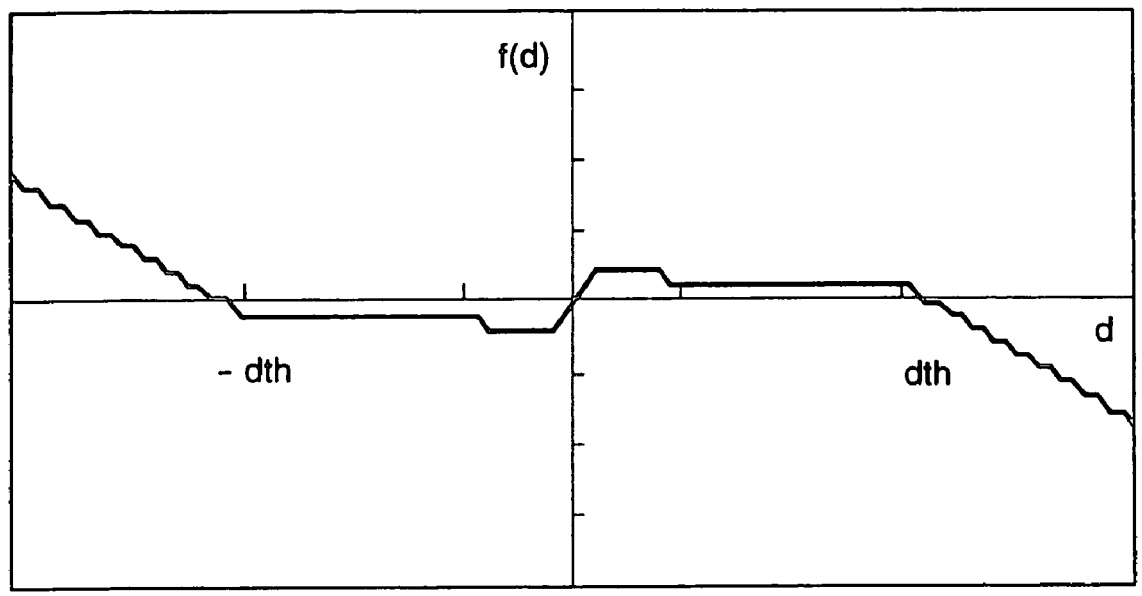
FIG. 3 is a schematic diagram of an example of contents of the lookup table according to the first embodiment of the present invention.

FIG. 3 shows an example of contents of the lookup table. As shown in FIG. 3, if an absolute value of the difference "d" is below a threshold "dth", the change value "f(d)" corresponds to the area of the expression (5). If the absolute value of the difference "d" is above the threshold "dth", the change value "f(d)" corresponds to the area of the expression (6). By setting such change value "f(d)", as for minute change of pixel value for two neighboring pixels, the coded noise is reduced by the smoothing process. Furthermore, as for a large change of pixel value for two neighboring pixels, the present pixel is decided to be an edge part and emphasized as the edge by the sharpening process.

In this filter processing, the previous output value Q[t−1] by one unit of time compared with the input value P[t], i.e., the output value Q[t−1] of previous pixel "t−1" neighboring the present pixel "t" of the input value P[t], is utilized. In this cyclic filter processing, a phase-lag is generated, and it is not suitable for this processing to simply utilize for image processing. Accordingly, hereinafter, by executing this processing a plurality of times, this problem is avoided.

Figure 4:
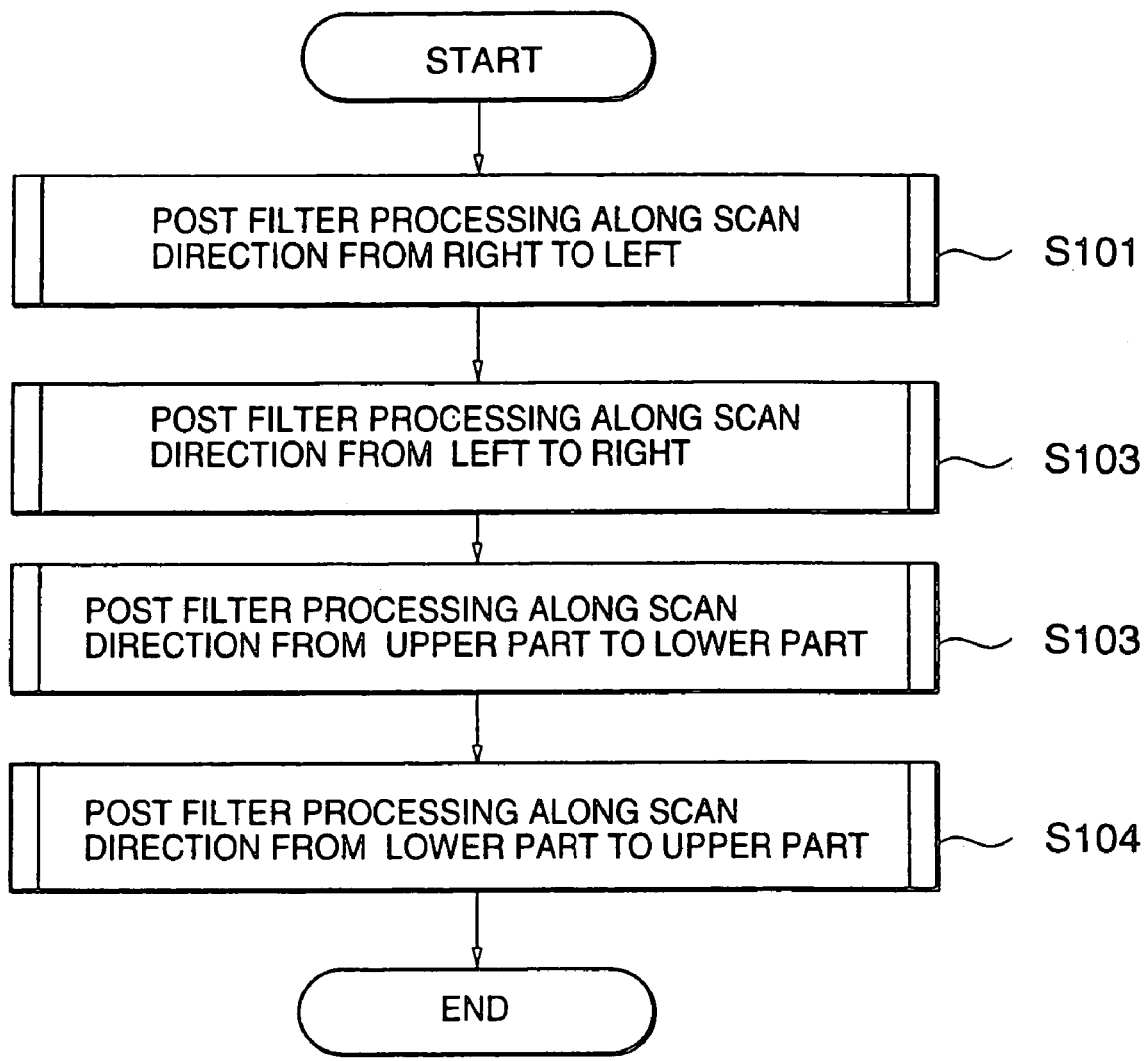
FIG. 4 is a flow chart of a post filter processing according to the first embodiment of the present invention.

FIG. 4 is a flow chart of the post filter processing using the image filter processing apparatus in FIG. 1. In this post filter processing, the filter processing is executed along four directions of the frame for the input image. First, a post filter processing is executed along a scan direction from right to left on the frame (S101). As shown in FIG. 5A, the post filter processing is executed for each pixel along a scan direction from right to left in order. Next, the post filter processing is executed along a reverse scan direction from left to right on the frame (S102). As shown in FIG. 5B, the post filter processing is executed for each pixel along a scan direction from left to right in order. In the same way, the post filter processing is executed along a scan direction from the upper part to the lower part (S103). Next, the post filter processing is executed along a scan direction from the lower part to the upper part (S104). As shown in FIGS. 5C and 5D, the post filter processing is executed for each pixel along a scan direction from the upper part to the lower part and along a reverse scan direction from the lower part to the upper part in order.

If the input signal is a color image signal, for example, a luminance signal Y and two chrominance signals Cb and Cr, the above-mentioned post filter processing is respectively executed for three signals Y, Cb, Cr of each pixel. In this way, by executing filter processing along mutual reverse directions, the phase-lag as a defect of the cyclic filter processing using previous output value is avoided. Furthermore, even if the filter processing is executed along four directions as shown in FIGS. 5A~5D, the calculation quantity necessary for the filter processing of one pixel is eight times addition only.

In the first embodiment, the filter processing is executed in order along each direction from right to left, from left to right, from upper part to lower part, and from lower part to upper part. However, if the first direction and the second direction respectively includes as effect to mutually reduce a noise, the order of the directions may be arbitrarily determined. Furthermore, four directions are shown as example in FIGS. 5A~5D. However, two directions between right and left, or between upper part and lower part, may be used. Alternatively, eight directions including slant directions may be used.

FIG. 6 shows a schematic diagram of effect of the post filter processing according to the first embodiment. As a specific feature of this filter processing, a signal element with a small change such as coded noise is reduced by a smoothing process. Conversely, a signal element with a large change such as an edge is emphasized by a sharpening process. In this way, by executing the post filter processing, an image in which a noise feeling is few and a sharp degree is high is obtained.

As mentioned-above, in the image filter apparatus of the first embodiment, the reduction of coded noise and the sharpening of edge can be simultaneously executed by small calculation quantity.

Figure 7:
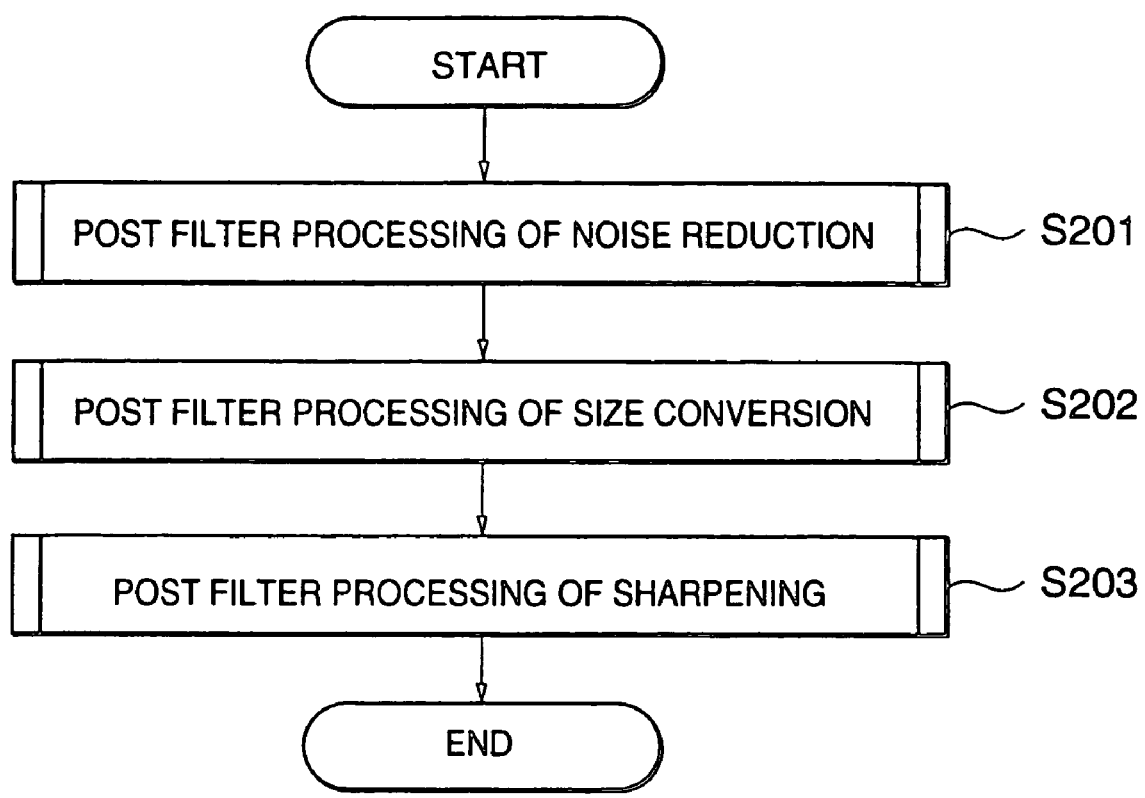
FIG. 7 is a flow chart of an image filter processing according to a second embodiment of the present invention.
Figure 8:
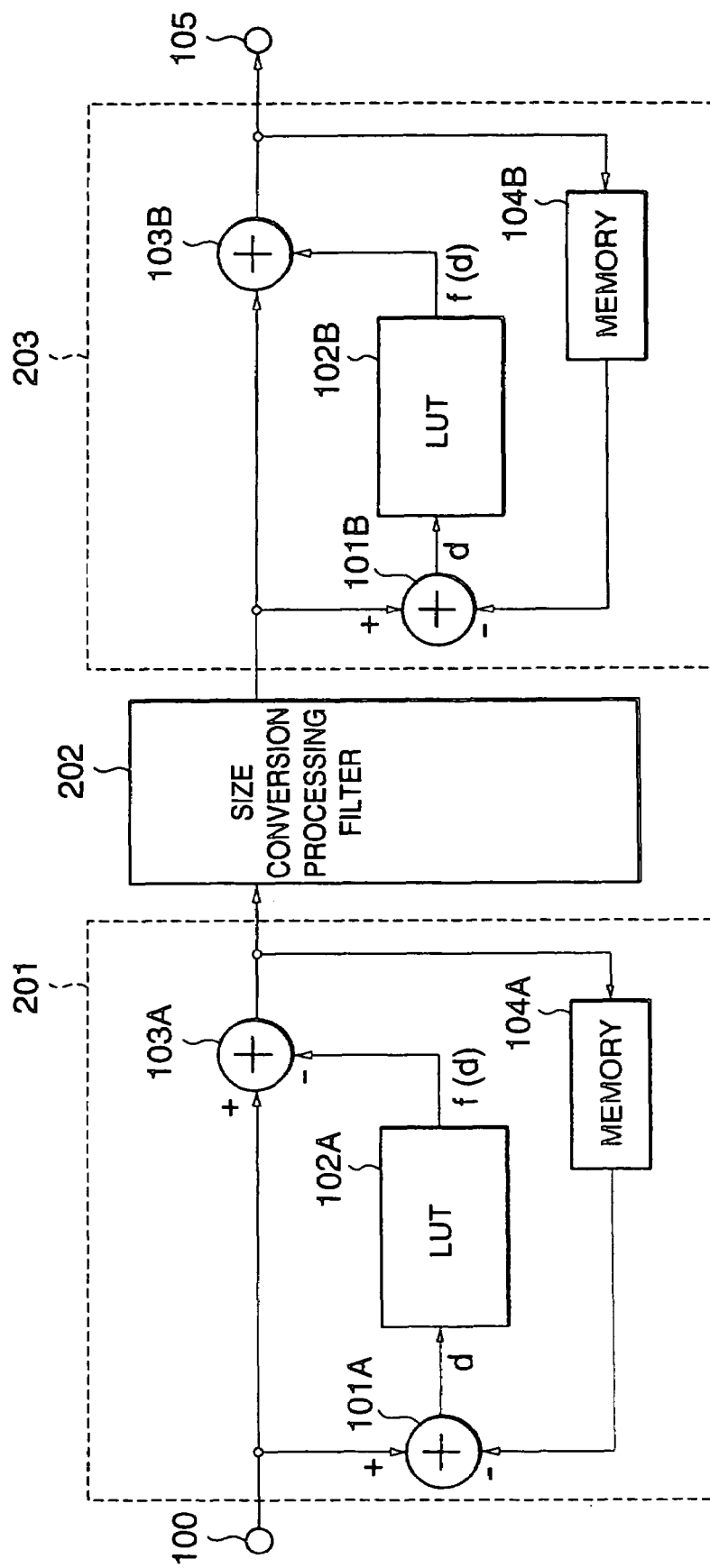
FIG. 8 is a block diagram of the image processing apparatus according to the second embodiment of the present invention.

Next, as the second embodiment of the present invention, an example to execute the post filter processing and a size conversion processing for coded image is explained. FIG. 7 is a flow chart of processing in case of executing both the post filter processing and the size conversion processing for the coded image. FIG. 8 is a block diagram of the image processing apparatus according to the second embodiment.

Figure 9:
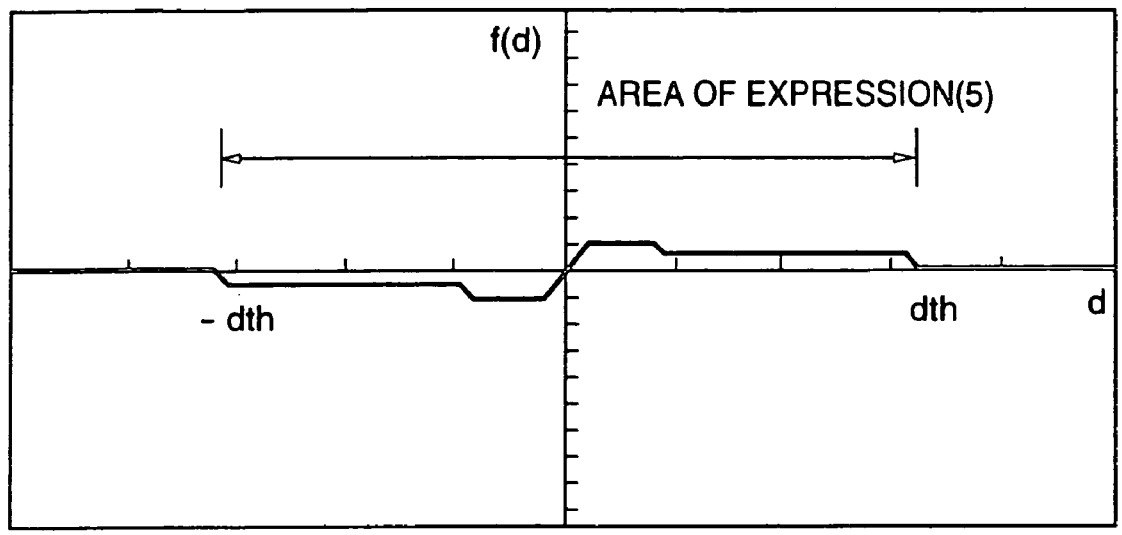
FIG. 9 is a schematic diagram of concrete of contents of the lookup table in a noise reduction filter processing unit according to the second embodiment of the present invention.

First, a noise reduction filter processing unit 201 executes a post filter processing of noise reduction (S201). The noise reduction filter processing unit 201 includes the same components of the image filter processing apparatus as in the first embodiment. As shown in FIG. 8, the noise reduction filter processing unit 201 includes an adder 101A, a lookup table 102A, an adder 103A, and a memory 104A. In this case, a function "f(d)" used for the lookup table 102A is shown in FIG. 9. If an absolute value of the difference "d" is below a threshold value "dth", the function "f(d)" is represented as values corresponding to area of the expression (5).

Next, as for the image of which noise is reduced at S201, a size conversion processing unit 202 composed of a typical FIR filter executes a conversion processing of image size (S202). As one example, a method for utilizing FIR filter of five taps used for SM3 as test model of MPEG-1 is explained. In this method, in case of double-magnification of image size, zero-interpolation is executed for space between pixels along the magnification direction on the image, and a magnified image is created using FIR filter of five taps "(−3, 0, 35, 64, 35, 0, −3)/128". In case of half-reduction of image size, pixels of the image are sub-sampled at ½ rate using FIR filter of five taps "(−29, 0, 88, 138, 88, 0, −29)/256".

Figure 10:
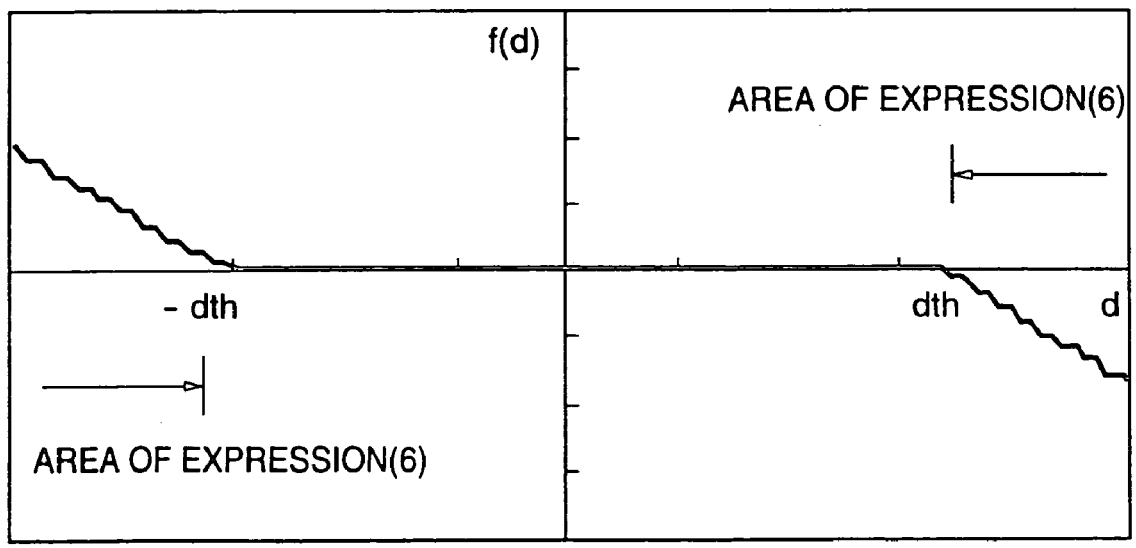
FIG. 10 is a schematic diagram of example of contents of the lookup table in a sharpening filter processing unit according to the second embodiment of the present invention.

A sharpening filter processing unit 203 executes a post filter processing of sharpening (S203). The sharpening filter processing unit 203 includes the same components as the image filter processing apparatus in the first embodiment. As shown in FIG. 8, the sharpening filter processing unit 203 includes an adder 101B, a lookup table 102B, an adder 103B, and a memory 104B. In this case, a function "f(d)" used for the lookup table 102B is shown in FIG. 10. If an absolute value of the difference "d" is above a threshold "dth", the function "f(d)" is represented as values corresponding to area of the expression (6). Accordingly, if a difference between two pixel values of a present pixel and a previous pixel is above the threshold, the present pixel is decided as an edge part and emphasized as the edge part by using the sharpening process.

Figure 11:
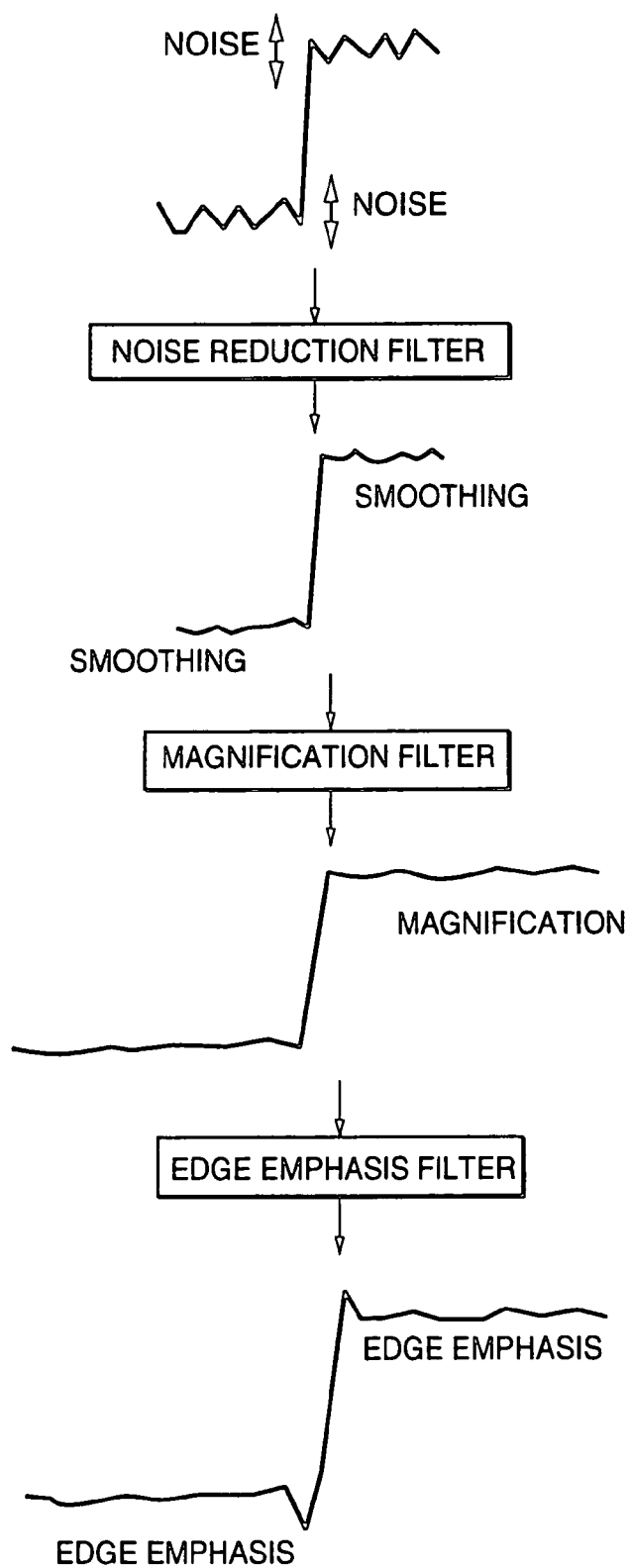
FIG. 11 is a schematic diagram showing an effect of the image filter processing according to the second embodiment of the present invention.

FIG. 11 shows an effect of the image filter processing of the second embodiment in case of executing the noise reduction filter processing, the size conversion processing (magnification processing), and the sharpening filter processing. First, a minute change element of coded noise is removed by the noise reduction filter. Next, the image having the coded noise removed is magnified. Then, an edge part in the magnified image is emphasized by the sharpening filter. By executing each processing in this order, in case of magnification, the magnified image does not include the coded noise but includes sharp edges.

As mentioned-above, in the present invention, the coded noise reduction processing and the sharpening processing can be simultaneously executed by few calculation quantity. Furthermore, in case of executing the size conversion processing, the post filter processing can be effectively executed for the coded image.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A computer system, comprising:
   a memory configured to temporarily store an output value as a filter processing result;
   a first calculator configured to calculate a difference between an input value of an image signal and the output value stored in said memory, the output value being the filter processing result of a previous input value;
   a lookup table configured to respectively store a plurality of differences and corresponding change values, and to output a change value corresponding to the difference calculated by said first calculator, the change value being a product of the difference and a value which is above "0" and below "1" if an absolute value of the difference is below a threshold, and the change value being a product of the difference and a value which is above "−1" and below "0" if the absolute value is above the threshold; and, a second calculator configured to output a difference between the input value and the change value and to store the difference being newly stored in said memory.

2. The computer system according to claim 1, wherein the input value corresponds to one pixel of an image; and
   wherein the previous input value corresponds to another pixel neighboring the one pixel along the same scan line on the image.

3. The computer system according to claim 2, wherein the input value includes at least a luminance signal of the one pixel.

4. The computer system according to claim 3, further comprising an input terminal configured to continually input the image pixel-by-pixel along a scan direction.

5. The computer system according to claim 4, wherein said input terminal inputs the image along one of the scan directions from right to left and from left to right, and inputs the image again along the other of the scan directions.

6. The computer system according to claim 4, wherein said input terminal inputs the image along one of the scan directions from upper part to lower part and from lower part to upper part, and inputs the image again along the other of the scan directions.

7. The computer system according to claim 2, wherein said memory temporarily stores the output value of the pixel neighboring the one pixel while said input terminal inputs the image signal of the one pixel.

8. The computer system according to claim 7, wherein said first calculator subtracts the output value of the neighboring pixel from the input value of the one pixel, the subtraction result being the difference.

9. The computer system according to claim 8, wherein said second calculator subtracts the change value from the input value of the one pixel, the subtraction result being the output value of the one pixel.

10. A computer system, comprising:
    a noise reduction filter processing unit configured to execute a noise reduction filter processing of an input image signal;
    a size conversion processing unit configured to execute a size conversion processing of an image signal output from said noise reduction filter processing unit; and
    a sharpening filter processing unit configured to execute a sharpening filter processing of an image signal output from said size conversion processing unit;
    wherein said noise reduction filter processing unit including:
    a first memory configured to temporarily store an output value as a noise reduction filter processing result;
    a first calculator configured to calculate a difference between an input value of the image signal and the output value stored in said first memory, the output value stored in said first memory being the noise reduction filter processing result of a previous input value of the image signal;
    a first lookup table configured to store a plurality of differences and corresponding change values, and to output a change value corresponding to the difference calculated by said first calculator, the change value being a product of the difference and a value which is above "0" and below "1" if an absolute value of the difference is below a threshold; and
    a second calculator configured to output a difference between the input value and the change value from the first lookup table and to store the difference in said first memory;

wherein said sharpening filter processing unit including:
a second memory configured to temporarily store an output value as a sharpening filter processing result;
a third calculator configured to calculate a difference between an input value from said size conversion processing unit and the output value stored in said second memory, the output value stored in said second memory being the sharpening filter processing result of a previous input value from said size conversion processing unit;
a second lookup table configured to store a plurality of differences and corresponding change values, and to output the change value corresponding to the difference calculated by said third calculator, the change value being a product of the difference and the value which is above "−1" and below "0" if an absolute value of the difference is above a threshold; and,
a fourth calculator configured to output a difference between the input value from said size conversion processing unit and the change value from the second lookup table, and to store the difference in said second memory.

11. The computer system according to claim 10, wherein the input value of the image corresponds to one pixel of an image, and
wherein the previous input value of the image signal corresponds to a pixel neighboring the one pixel along the same scan line on the image.

12. The computer system according to claim 11, wherein the input value of the image signal includes at least a luminance signal of the one pixel.

13. The computer system according to claim 12, wherein said noise reduction filter processing unit further comprising an input terminal configured to continually input the image pixel-by-pixel along a scan direction.

14. The computer system according to claim 13, wherein said input terminal inputs the image along one of the scan directions from right to left and from left to right, and inputs the image again along the other of the scan directions.

15. The computer system according to claim 13, wherein said input terminal inputs the image along one of the scan directions from upper part to lower part and from lower part to upper part, and inputs the image again along the other of the scan directions.

16. The computer system according to claim 10, wherein said size conversion processing unit executes a magnification processing for the image signal output from said noise reduction filter processing unit.

17. The computer system according to claim 13,
wherein said first calculator subtracts the output value of the previous pixel from the input value of the one pixel, the output value of the previous pixel being obtained from said first memory, the input value of the one pixel being obtained from said input terminal, and
wherein said second calculator subtracts the change value from the input value of the one pixel, the subtraction result being input as a noise reduction filter processing result of the one pixel to said size conversion processing unit.

18. The computer system according to claim 17,
wherein said third calculator subtracts the output value of the previous pixel from the input value of the one pixel, the output value of the previous pixel being obtained from said second memory, the input value of the one pixel being obtained from said size conversion processing unit, and
wherein said fourth calculator subtracts the change value from the input value of the one pixel, the subtraction result being output as a sharpening filter processing result of the one pixel.

* * * * *